Sept. 27, 1927.
M. BARTHOLDY
1,643,570
IMPLEMENT FOR TESTING CONES
Filed July 8, 1924
2 Sheets-Sheet 1
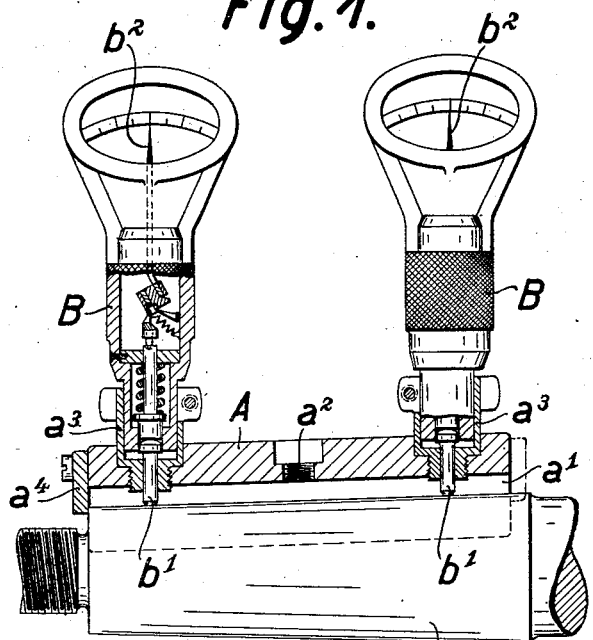
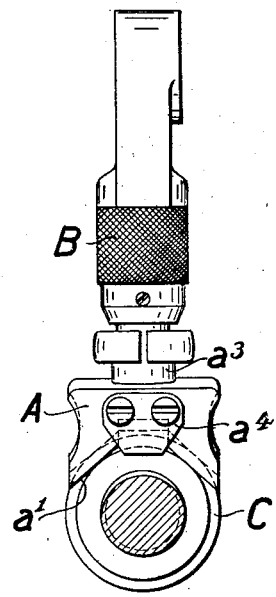
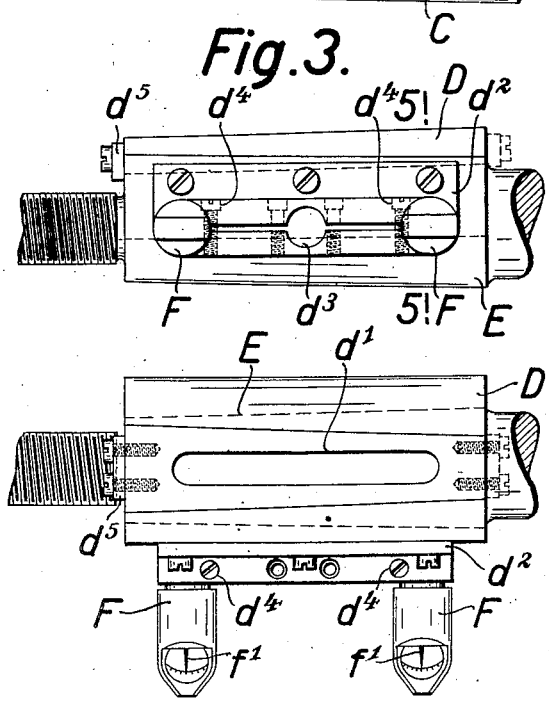
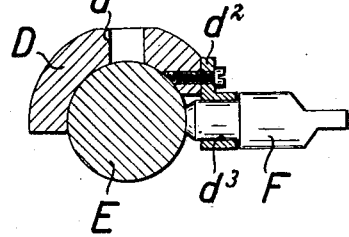

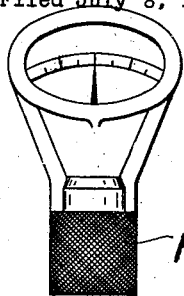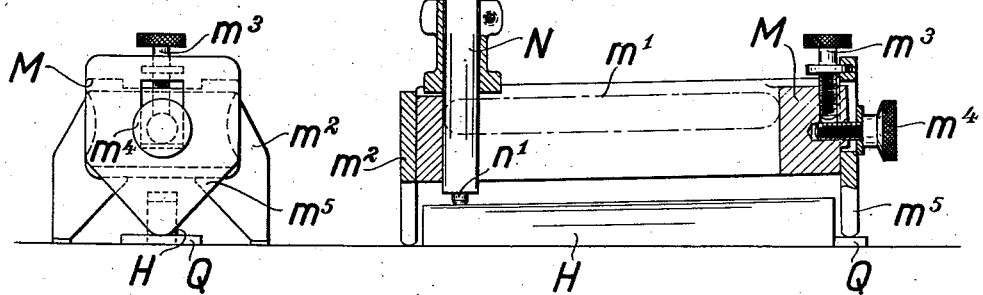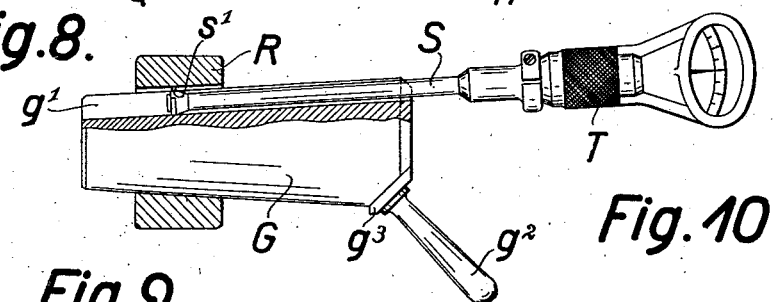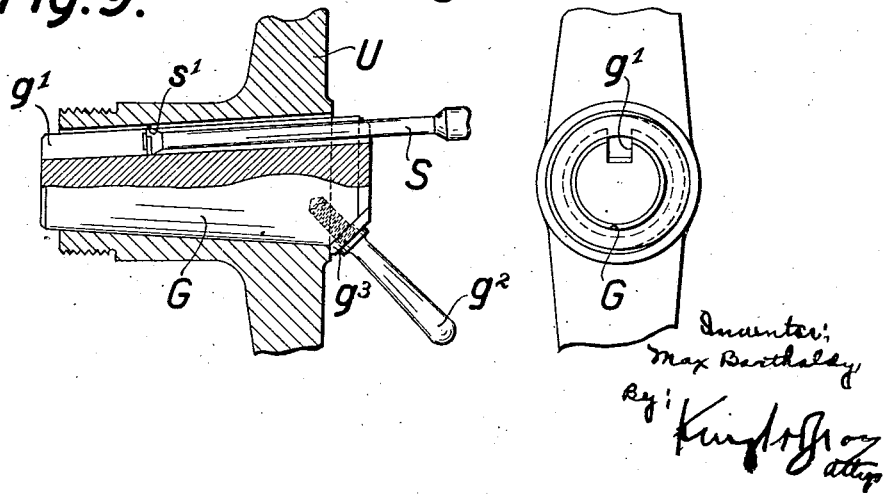

Patented Sept. 27, 1927.

1,643,570

UNITED STATES PATENT OFFICE.

MAX BARTHOLDY, OF ESSEN, GERMANY, ASSIGNOR TO FRIED. KRUPP AKTIENGE-SELLSCHAFT, OF ESSEN-ON-THE-RUHR, GERMANY.

IMPLEMENT FOR TESTING CONES.

Application filed July 8, 1924, Serial No. 724,884, and in Germany July 13, 1923.

This invention relates to implements for testing cones, and it has more particularly reference to implements of the kind which consist of a carrier provided with a gage and which are at first adjusted by the aid of a standard cone.

With a known implement of the said kind, a testing of cones can only be effected if the cones have a cylindrical journal at least at one of their base-faces. With another well-known implement, the testing is effected by the intermediary of two rolls which are rotatably mounted in a carrier and the cross-section of which is constituted by an irregular polygon. When testing a cone those rolls bear against its surface and are adjusted according to the inclination of the cone in such a manner that the outwardly directed face of the carrier extends parallelly with the longitudinal surface line of the cone which is turned away from it. However, the testing by means of this implement is inaccurate and cumbersome.

Now, the invention has for its object to avoid the aforesaid drawbacks and to provide an implement which, while of a simple construction and easy to handle, allows of cones being accurately tested even if they are still on the lathe.

Several embodiments of the subject-matter of the invention are illustrated in the accompanying drawings in which:

Fig. 1 is a view, partly in section, of an implement for testing outside cones, the implement being shown in connection with such an outside cone Fig. 2 is an end view of Fig. 1, seen from the left;

Fig. 3 is a view of another embodiment of an implement for testing outside cones;

Fig. 4 is a top plan corresponding to Fig. 3;

Fig. 5 is a section along the line 5—5 of Fig. 3, seen from the left;

Fig. 6 is a view, partly in section, of a third embodiment in connection with a wedge-shaped body;

Fig. 7 is an end view of Fig. 6, seen from the right;

Fig. 8 is a view, partly in section, of an implement for testing inside cones in connection with a comparison ring;

Fig. 9 is a view, similar to Fig. 8, of the implement in connection with an inside cone to be tested, some parts being broken away, and Fig. 10 is an end view of Fig. 9, seen from the left.

The embodiment illustrated in Figs. 1 and 2 will be described first.

A carrier A having a recess $a^1$ is provided with three bores $a^2$ the central longitudinal axes of which bisect the angle which is formed by the side faces of the recess $a^1$. Screwed into two of the bores $a^2$ are sockets $a^3$ which are designed to receive precision indicators B of well-known construction. The feeling bolts $b^1$ of the precision indicators B project into the recess $a^1$ of the carrier A. The carrier A carries further at one of its head faces a stop $a^4$.

The implement is first applied to a standard cone corresponding exactly to the cone to be tested, so that the stop $a^4$ touches one of the two base-faces of the standard cone. Thereupon the precision indicators B mounted in two of the bores $a^2$ the selection of which depends on the respective length of the cone, are adjusted by means of the sockets $a^3$ in such a manner as to cause the pointers $b^2$ to register with a definite scale mark, preferably zero. If the implement is now applied in the same way to the cone C to be tested which is for instance fixed in a lathe, the pointers $b^2$ will indicate eventual deviations of the cone to be tested with respect to the standard cone.

The second embodiment, illustrated in Figs. 3 and 5, is more particularly adapted for the quantity manufacture of cones. A shell D the inner surface of which accurately conforms to the outer surface of a standard cone, has removably fastened to it a holder $d^2$ which, the same as the carrier A of the first embodiment, is provided with bores $d^3$ designed to receive precision indicators F. The precision indicators F the central longitudinal axes of which exactly extend radially with relation to the axis of the cone, are clamped in their position by set screws $d^4$. The shell D possesses a longitudinal slot $d^1$ designed to receive a testing implement hereinafter described and it further carries at one of its head faces a stop $d^5$ corresponding to the stop $a^4$ of the first embodiment.

After the implement has been adjusted by the aid of a standard cone, it is applied to the cone E to be tested and the shell D smoothly pressed against the cone at the side lying oppositely to the precision indicators F. An eventual deviation of the cone angles from each other may then be easily determined in accordance with the deflection of the pointers $f^1$. If it is desired to avoid the unilateral pressing of the shell D against the cone, precision indicators have to be arranged at both sides of the shell, those indicators indicating however only half the amount of the deviation.

The third embodiment, Figs. 6 and 7, will now be described in its use for testing wedge-shaped articles. M is an accurately adjusted guide bar having a longitudinal slot $m^1$ in which is mounted for longitudinal shifting motion a depth gage N which is perpendicular with relation to the bar M and provided with a precision indicator P. The bar M carries in rigid connection with one of its head faces a double-legged bracket $m^2$ and at its other head face a bracket $m^5$ which is adapted to be vertically adjusted by means of a screw $m^3$ and to be clamped by means of a screw $m^4$. The supporting faces of both brackets $m^2$ and $m^5$ are rounded according to the same radius (Fig. 6). The testing of a wedge is effected in the following manner. The implement is first placed on a measuring table where the bracket $m^5$ is adjusted by means of the screw $m^3$ in such a manner that the precision indicator P of the depth gage N which is at the same time shifted with its feeling bolt $n^1$ gliding on a plane, indicates the same deflection in its two limit positions. The bracket $m^5$ is then fixed by means of the screw $m^4$ and a measure Q corresponding to the angle of the wedge H to be tested placed below the supporting face of the bracket $m^5$. The wedge H is thereupon put underneath the bar M, the feeling bolt $n^1$ of the depth gage placed on the wedge face and the depth gage fixed in a position in which the precision indicator P indicates a definite deflection. Upon shifting the depth gage N, the precision indicator will then constantly indicate the same deflection if the wedge angle is correct and the wedge face entirely smooth.

In order to ascertain whether the longitudinal surface lines of the cone tested by means of the implement according to Figs. 3 to 5, are straight, the depth gage N (Fig. 6) is introduced into the slot $d^1$ of the shell D (Figs. 3 to 5) and the precision indicator P set for a definite scale mark. For the rest, the testing method corresponds to the method described already with relation to the Figs. 6 and 7. If the implement according to Figs. 6 and 7 should be used for testing a cone, it is only necessary to adapt the brackets $m^2$ and $m^5$ to the surface of the cone.

With the implement according to Figs. 8 to 10 which is designed for use in testing inside cones, the standard cone G forms part of the implement. The groove $g^1$ of the cone serves to receive the portion of a hole gage S which carries the feeling bolt $s^1$. The standard cone is further provided with a handle $g^2$ and a stop $g^3$. The adjustment of the implement is effected by the aid of a comparison ring R the inner surface of which is made to accurately conform to the outer surface of the standard cone G.

For testing an inside cone, the deflection which the precision indicator T shows upon the implement being adjusted according to the comparison ring R, is ascertained and the implement introduced into the inside cone to be tested of a machinery part U until the stop $g^3$ comes to bear against an end face of the hub of the machinery part U. If, in shifting the hole gage along the groove $g^1$, the precision indicator constantly indicates the previously ascertained deflection, the angle of the inside cone corresponds exactly to the angle of the standard cone G. Eventual deviations may be readily determined.

I claim—

1. An instrument for testing conical bodies comprising, a gauge carrier, and a gauge carried thereby, said gauge having a feeling bolt adapted to feel the surface of a conical body to be tested, said carrier being preliminarily fitted to a standard conical body for setting the gauge to a standard index, said carrier being then applied to a conical body to be tested, said carrier having bearing means adapted to automatically adjust it in the same position on the conical body to be tested as on the standard conical body, a deviation from the standard being directly indicated by said gauge upon such application.

2. An instrument for testing conical bodies comprising, a gauge carrier, and a gauge carried thereby, said carrier being in the form of a shell having inner surfaces conformed exactly to the surfaces of a standard conical body, said gauge having a feeling bolt substantially perpendicular relative to an element of the conical inner surfaces of said carrier, said carrier being preliminarily fitted to a standard conical body for setting the gauge to a standard index, said carrier being then applied to a conical body to be tested, a deviation from the standard is directly indicated by said gauge.

3. An instrument according to claim 1 wherein said carrier is provided with a longitudinal slot and a second gauge adapted to traverse said slot in operative contact with the conical body to be tested for testing the rectilinearity of the latter.

4. An instrument according to claim 2 wherein said carrier is provided with a longitudinal slot and a second gauge adapted to traverse said slot in operative contact with the conical body to be tested for testing the rectilinearity of the latter.

The foregoing specification signed at Cologne, Germany, this 17th day of June, 1924.

MAX BARTHOLDY.